United States Patent
Wang et al.

(10) Patent No.: US 11,167,770 B2
(45) Date of Patent: Nov. 9, 2021

(54) AUTONOMOUS VEHICLE ACTUATION DYNAMICS AND LATENCY IDENTIFICATION

(71) Applicant: Baidu USA LLC, Sunnyvale, CA (US)

(72) Inventors: Yu Wang, Sunnyvale, CA (US); Qi Luo, Sunnyvale, CA (US); Shu Jiang, Sunnyvale, CA (US); Jinghao Miao, Sunnyvale, CA (US); Jiangtao Hu, Sunnyvale, CA (US); Jingao Wang, Sunnyvale, CA (US); Jinyun Zhou, Sunnyvale, CA (US); Jiaxuan Xu, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 80 days.

(21) Appl. No.: 16/790,036

(22) Filed: Feb. 13, 2020

(65) Prior Publication Data

US 2021/0253118 A1 Aug. 19, 2021

(51) Int. Cl.
*B60W 50/08* (2020.01)
*B60W 50/035* (2012.01)
*B60W 50/00* (2006.01)

(52) U.S. Cl.
CPC ........ *B60W 50/085* (2013.01); *B60W 50/035* (2013.01); *B60W 2050/0028* (2013.01); *B60W 2050/0031* (2013.01); *B60W 2050/0037* (2013.01)

(58) Field of Classification Search
CPC . B60W 2050/0028; B60W 2050/0031; B60W 2050/0037; B60W 2050/0039; B60W 2050/004; B60W 2050/0041
See application file for complete search history.

(56) References Cited

U.S. PATENT DOCUMENTS

| | | | |
|---|---|---|---|
| 7,460,984 B1* | 12/2008 | Clark | G06F 30/3312 703/2 |
| 7,487,077 B1* | 2/2009 | Clune | G06F 30/20 703/17 |
| 2014/0238368 A1* | 8/2014 | Jammoussi | F02D 41/30 123/672 |
| 2014/0278303 A1* | 9/2014 | Larimore | G06F 30/20 703/2 |
| 2018/0086351 A1* | 3/2018 | Zhu | B60W 30/16 |
| 2018/0088576 A1* | 3/2018 | Kong | B60W 50/06 |
| 2018/0091074 A1* | 3/2018 | Pramod | B62D 5/0463 |
| 2018/0143632 A1* | 5/2018 | Zhu | B60W 10/18 |
| 2020/0363801 A1* | 11/2020 | He | G05D 1/0212 |

\* cited by examiner

*Primary Examiner* — Thomas G Black
*Assistant Examiner* — Sara J Lewandroski
(74) *Attorney, Agent, or Firm* — Womble Bond Dickinson (US) LLP

(57) ABSTRACT

Systems and methods are disclosed for identifying time-latency and subsystem control actuation dynamic delay due to second order dynamics that are neglected in control systems of the prior art. Embodiments identify time-latency and subsystem control actuation delays by developing a discrete-time dynamic model having parameters and estimating the parameters using a least-squares method over selected crowd-driving data. After estimating the model parameters, the model can be used to identify dynamic actuation delay metrics such as time-latency, rise time, settling time, overshoot, bandwidth, and resonant peak of the control subsystem. Control subsystems can include steering, braking, and throttling.

20 Claims, 10 Drawing Sheets

400

| Application 401 | Planning and Control 402 | Perception 403 | Device Driver(s) 404 | Firmware 405 | Hardware 406 |

FIG. 4

AUTONOMOUS VEHICLE ACTUATION DYNAMICS AND LATENCY IDENTIFICATION

TECHNICAL FIELD

Embodiments of the present disclosure relate generally to operating autonomous vehicles. More particularly, embodiments of the disclosure relate to a uniform and systematic process for identifying time-latency and actuation dynamic delay in control autonomous vehicle control subsystems, to improve autonomous vehicle control.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. However, conventional motion planning operations estimate the difficulty of completing a given path mainly from its curvature and speed, without considering the differences in features for different types of vehicles. Same motion planning and control is applied to all types of vehicles, which may not be accurate and smooth under some circumstances.

Due to the usage of electronic determination and actuation of control systems such as brakes, throttle, and steering ("drive-by-wire"), there exists some latency time and system dynamic delays in the vehicle actuation system. Time-latency can occur due to delay in detecting that a control command is needed to stay on the planned trajectory. Time-latency can be attributable to data collection and processing time needed to identify objects surrounding the vehicle and attributable to computing of a control command needed to stay on the planned trajectory. Time-latency can be on the order of 50-100 milliseconds (ms). Actuation dynamic delay can occur a control subsystem when a control command is received by a control subsystem, such as brakes, throttle, or steering, and the control subsystem must actuate physical components to execute the control command. Actuation dynamic delay can be attributable to physical actuators or elements, such as motors, drive belts, brake pads and cylinders, or combustion, needing time to implement the physical actions that implement the control command. Actuation dynamic delay of a received command can manifest as a rise time of the actuation, an overshoot amount, and a settling time for a measured state of the physical actuator to match the received control command. Actuation dynamic delay can be on the order of several hundreds of milliseconds, up to 500 ms; substantially longer than latency.

Control subsystems such as brakes, steering, and throttle, are often provided by third-party suppliers, different from the party that develops a control system for the autonomous vehicle. Thus, developers of autonomous vehicle control subsystems must consider the operational characteristics of the control subsystems as a "black box". Accordingly, previous research efforts have typically treated the vehicle actuation latency and actuation dynamics as negligible, and have directly abandoned actuation latency and actuation dynamics from the vehicle control system dynamics when designing a model-based autonomous vehicle controller. As a result, during rapid acceleration or sharp or rapid turning driving scenarios, the autonomous vehicle control actions usually cannot follow the desired trajectory without some visible delay.

BRIEF DESCRIPTION OF THE DRAWINGS

Embodiments of the disclosure are illustrated by way of example and not limitation in the figures of the accompanying drawings in which like references indicate similar elements.

FIG. 4 is a block diagram illustrating architecture of an autonomous driving system according to one embodiment.

DETAILED DESCRIPTION

Figure 1:
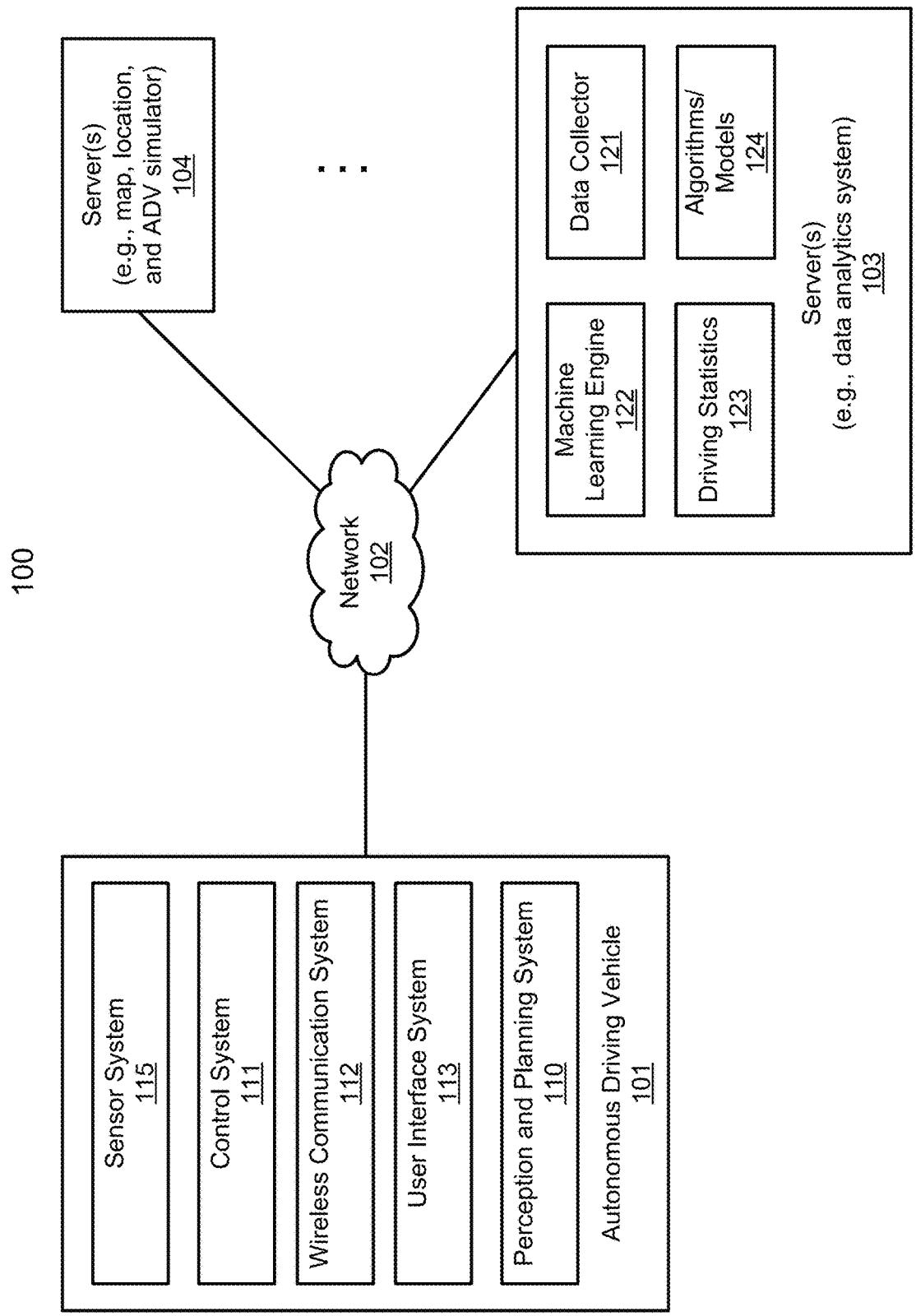
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

In an embodiment, a method of improving an autonomous driving vehicle (ADV) control system, includes, for each of one of more ADV control subsystems: generating a discrete-time dynamic model having a plurality of parameters, the dynamic model characterizing actuation dynamic delay of the ADV control subsystem, and generating an estimator that estimates a value for each of the plurality of parameters for the dynamic model using crowd-sourced ADV driving data for an identified driving scenario, and estimating the plurality of parameters using the estimator. The model, with the parameters estimated, can be used to determine a bandwidth metric and a resonant peak metric of the ADV control subsystem using the dynamic model and estimated parameters. The dynamic model can be transformed into a continuous-time system and can be used to determine a rise time metric, an overshoot metric, and a settling time metric for the ADV control subsystem (e.g. throttle, brake, and steering). The metrics can be used to generate an updated ADV subsystem controller that is distributed to one or more ADVs for use in driving the one or more ADVs. In an embodiment, actuation delay represents a difference between a time of initial execution of a received control command by the control subsystem and a time of a measured actuation of the subsystem responsive to the initial execution of the received control command. In an embodiment, the crowd-sourced ADV driving data is selected according to one or more of: a specified ADV type, a specified ADV controller type, or one or more specified ADV subsystem controller types. In an embodiment, the discrete-time dynamic model for the subsystem is a second order dynamic model of the form:

$$\text{subsystem}_{measured}(z) = \frac{b_1 z + b_2}{z^2 + a_1 z + a_2} \text{subsystem}_{desired}(z),$$

and the plurality of parameters are $a_1$, $a_2$, $b_1$, and $b_2$. In an embodiment, generating the discrete-time dynamic model further comprises introducing a time-latency term for the subsystem, the time-latency term representing a time between transmitting of a command by the ADV controller and an initial execution of the command by the ADV subsystem controller. In an embodiment, estimating the plurality of parameters includes performing a least-squares fit of crowd-sourced ADV driving data to determine the parameters of the dynamic model for the subsystem.

In an embodiment, any/all of the above method functionality can be implemented by a processing system, comprising one or more hardware processors coupled to a memory programmed with executable instructions that, when executed by the processing system, cause a computing system to implement the claimed functionality. In an embodiment, the memory can be a non-transitory computer-readable medium or other type of memory.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, simulated autonomous vehicle driving servers, or location servers, etc. An autonomous vehicle driving simulator server 104 can include data logging of driving records substantially identical to the data logging of a real autonomous driving vehicle. The driving simulator can be used to test proposed updates to autonomous vehicle control systems. The driving simulator can upload its driving records for processing by, e.g., server 103 algorithms 124 to generate a set of standardized metrics 124 that characterize performance of the autonomous vehicle control system.

An autonomous vehicle 101 refers to a vehicle that can be configured to be driven in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode. As described herein, in some embodiments, an autonomous vehicle is simulated in an autonomous driving simulator of server 104. Characteristics and identifiers, such as an autonomous vehicle type (e.g. Lexus®, Honda®, SmartCar®, Kia®, et al.) and an autonomous vehicle controller type (e.g. model predictive control, or linear quadratic regulator) can be used to identify simulated autonomous vehicles within an autonomous driving simulation system and driving records generated by a simulated autonomous vehicle driving session.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
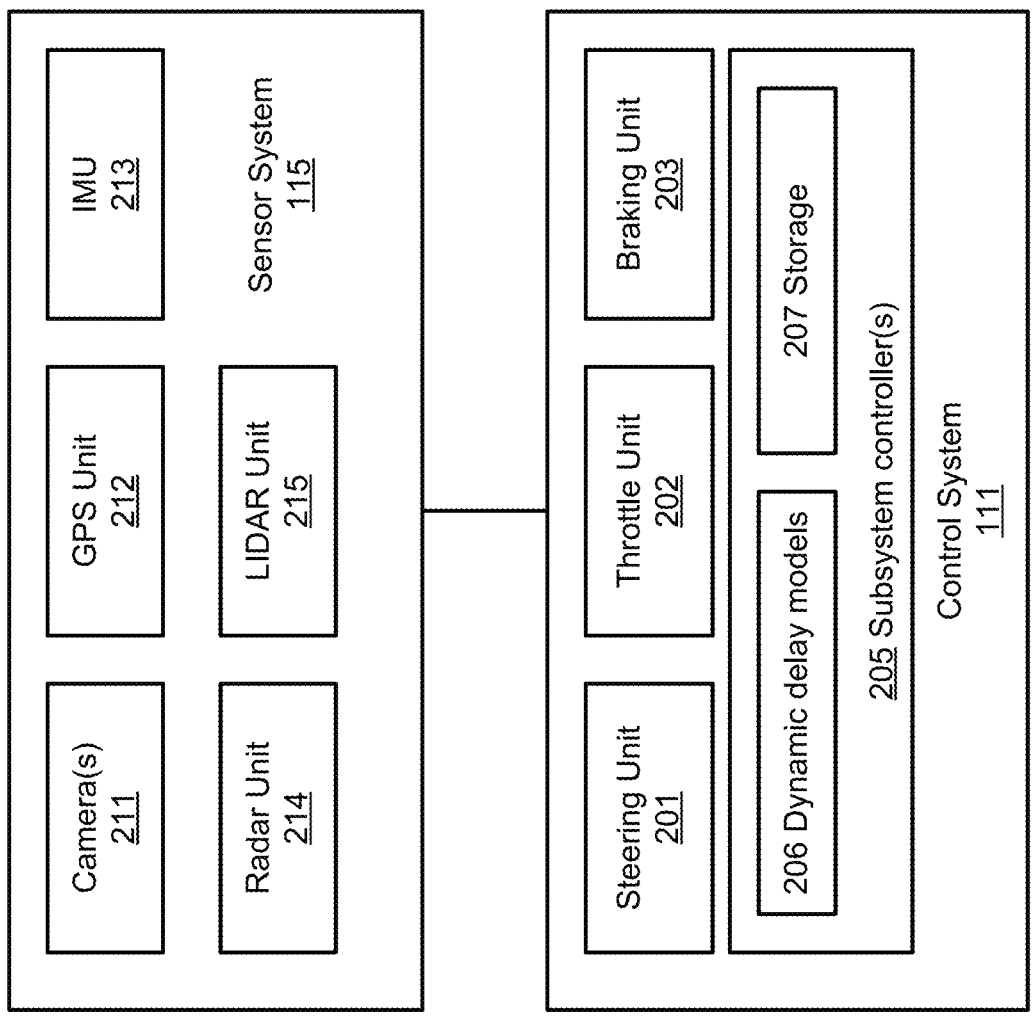
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle.

Control system 111 may further comprise subsystem controllers 206. Subsystem controllers 205 can include a controller for the steering unit 201, a controller for the throttle unit 202, and a controller for the braking unit 203. Each subsystem controller 205 receives one or more control commands from the ADV control system 111. As described with reference to FIG. 3C, below, the ADV control system 111 receives a trajectory path for the ADV to follow to navigate a portion of an ADV route. The control system 111 can determine an amount of steering, braking, and/or throttling that is needed to navigate the ADV along the trajectory path. Control system 111 then issues one or more commands to one or more control subsystems (steering unit 201, throttle unit 202, braking unit 203). A steering command can be in the form of a target steering angle, e.g. to the left or right of straight ahead, expressed in degrees or radians. A throttle command from the control system 111 to the throttle unit 202 can be e.g. a target speed, acceleration, or percentage of full throttle. A braking command from the control system 111 to the braking unit 203 can be, e.g. a target speed, a deceleration rate, or a percentage of full braking. Each control command from control system 111 to a control subsystem (steering unit 102, throttle 202, or braking 203) can be translated into a physical action on the control subsystem by a controller within the subsystem.

The physical actuation by a control subsystem of a command received from the control system 111 is not immediate. A time-latency in physical actuation represents a difference between a time issuing of a command from the controller 111 and the time that the subsystem controller outputs a command to begin the physic actuation. After execution of the command begins by the subsystem controller, dynamic delays exist in executing the command to attain the physical target actuation commanded by the controller 111. The systems and methods described herein determine metrics for each subsystem controller that characterize the time-latency and dynamic delays in physical actuation of the subsystem. An example command from an ADV controller to a subsystem controller, and the resulting time-latency and actuation dynamics of the subsystem are described below with reference to FIG. 3C.

Subsystem controller(s) 205 can include storage for dynamic delay models 206 and storage 207 for e.g. parameters of the dynamic models.

Subsystem controllers 205 can be integrated with ADV controller 111 or as third-party stand-alone subsystem controllers. In practice, subsystem controllers are often third-party controllers such that the ADV control system communicates with the subsystem controller via a programming interface, and the specifics of how a command is executed and actuated by the control subsystem are a "black box" to the ADV controller designer. Identifying the time-latency and actuation dynamic delays of a subsystem, as described herein, enable an ADV controller designer to generate improved ADV controllers, or subsystem add-on controllers, that account for time-latency and actuation dynamic delays of the control subsystems, without needing to know the cause or reason for the time-latency and actuation dynamic delays exist. Control subsystem time-latency and actuation dynamic delay are particularly important in driving scenarios that require rapid braking, accelerating, or steering. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Autonomous driving vehicle (ADV) 101 can generate and log driving records that capture data from the subsystems, e.g. sensor system 115, control system 111, and perception and planning system 110. The driving records can be uploaded to a server, e.g. server 103, for storage by data collector 121. A cross-platform control profiling system, stored in e.g. server 103 algorithms and models 124, can analyze driving records from a large plurality of ADVs and simulated ADVs to generate driving Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include a cross-platform control profiling system that generates a set of standardized statistics, or metrics, 123 characterizing performance of an autonomous driving control system of the ADV using ADV driving data and simulated ADV driving data ("cross-platform" meaning both real and simulated ADV driving records). Raw driving data records are uploaded from an ADV at a specified time, or manually, to date collector 121. Simulated ADV driving data is also uploaded to data collector 121. Algorithms 124 are used to generate the set of set of standardized metrics characterizing the performance of the ADV control system. The metrics are stored in driving statistics 123, and distributed to subscribing users, such as design engineers.

Figure 3A:
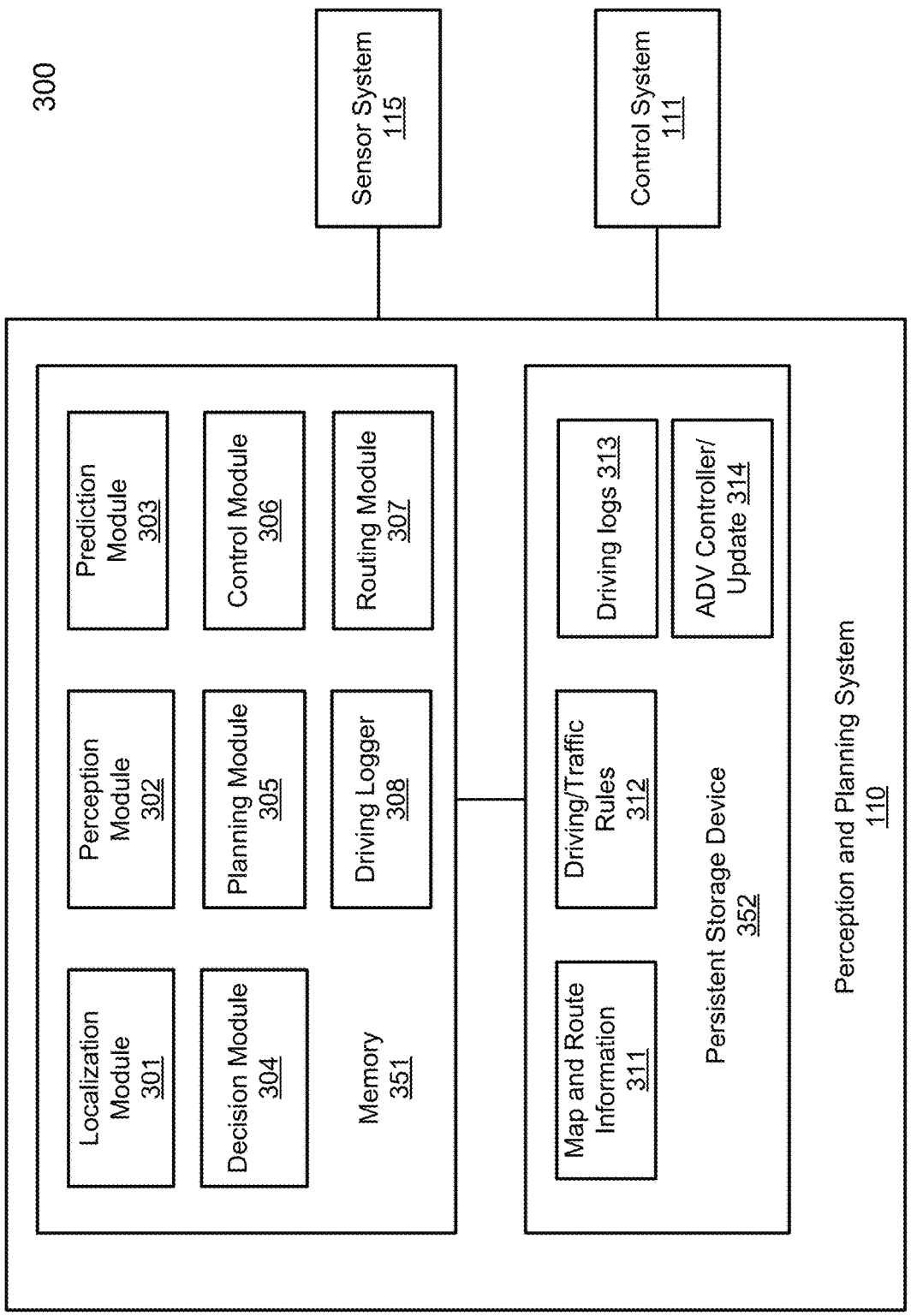
FIGS. 3A and 3B are block diagrams illustrating an example of a perception and planning system used with an autonomous vehicle according to one embodiment.
Figure 3B:
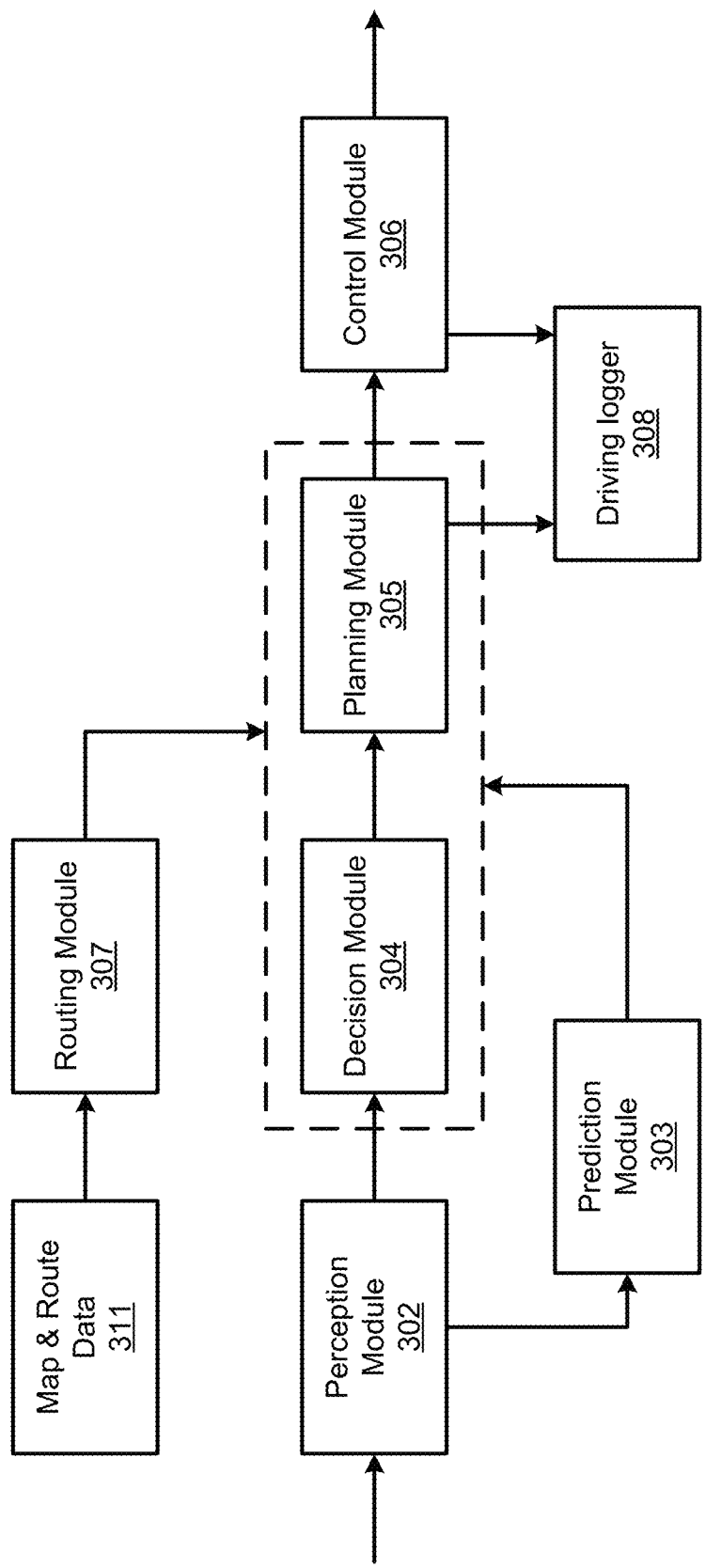

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307, and driving logger 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352. Persistent storage 352 may further include storage for ADV Controller updates 314.

ADV Controller updates 314 can include updates to the ADV controller 314, and/or one or more of the subsystem controllers 205 described above with reference to FIG. 2. ADV controller updates 314 can be generated, e.g. by server 103 or 104, using crowd-sourced driving logs 313 driving records from a large plurality of ADVs. Driving logs 313 driving records can be uploaded from ADV 101 to server 103 or 104. Server 103 or 104 can process the driving logs 313 to identify time-latency and actuation dynamic delays of each control subsystem (throttle, brakes, steering) as described with reference to FIGS. 5, 6, 7A and 7B, below.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/ path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Driving logger 308 records driving records from at least three data channels of the ADV control system: the control channel, the chassis channel, and the localization channel. The control channel produces information about control commands to control systems of the ADV, such as braking, throttle, and steering. The chassis channel produces information from various sensors, such as accelerometers, and readings of actual positions or actuations of the braking, throttle, and steering systems. The localization channel produces information regarding the actual location and heading of the ADV with reference to a standard reference such as a high-definition (HD) map or a global positioning satellite (GPS) system. Data records can be recorded at approximately 100 frames per second (fps), or at about 10 milliseconds (ms) per frame. Each driving record has a timestamp. A timestamp can be an absolute timestamp in the form of hh:mm:ss:ms (hours, minutes, seconds, milliseconds) relative to a start time, such as the start of a driving route. In embodiment, the timestamp can be a frame number, relative to a start time such as the start of the driving route. In an embodiment, each driving record can have additional have a date stamp in addition to the time stamp. Data logger 308 can log driving records for simulated ADV driving sessions as well as real-world ADV driving sessions.

Data logger 308 can write the driving records to a non-volatile storage such as driving logs storage 313. Driving logs 313 can be uploaded to a server system, e.g. server(s) 103-104, to generate a set of standardized performance metrics that grade the performance of a controller of the ADV. The controller of the ADV can be updated using the standardized set of metrics, and the updated controller of the ADV can be stored in non-volatile storage 314.

As shown on FIG. 3B, data logger 308 can also receive driving records from the planning module. The planning module driving records can be used to compare planned driving conditions vs. actual (or simulated) driving conditions, to grade the performance of the ADV controller.

Figure 3C:
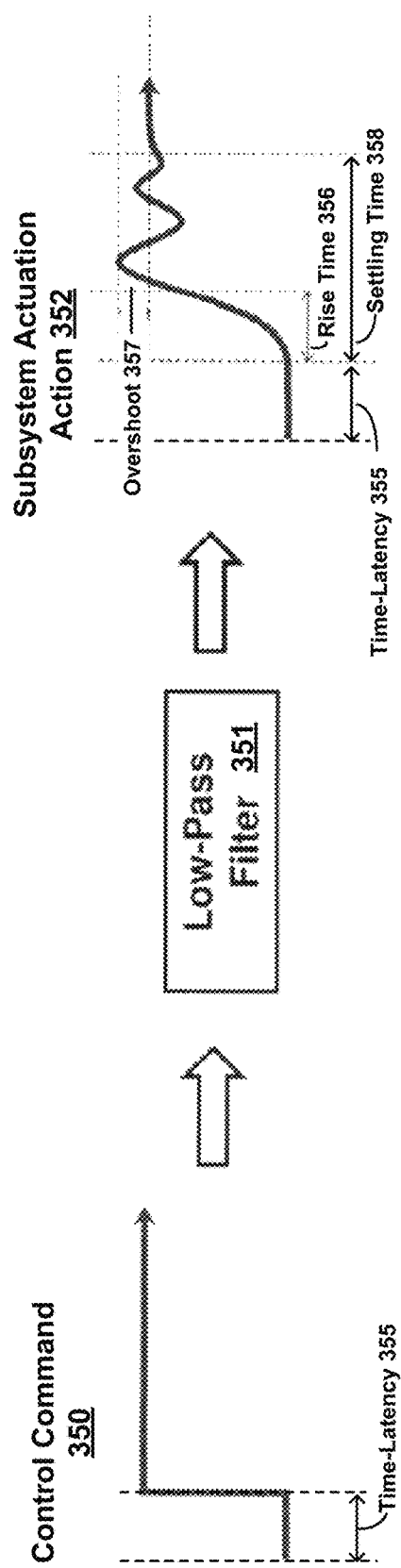
FIG. 3C illustrates an example ADV control command and an autonomous vehicle control subsystem actuation action response to the control command, according to some an embodiment.

FIG. 3C illustrates an example ADV control command and an autonomous vehicle control subsystem actuation action response to the control command, according to an embodiment. A hypothetical example control command 350 is shown as a step function. In practice, control inputs typically are not step functions. However, the control input well-illustrates the concepts to be described herein. Control command 350 has a time-latency 355. The time-latency is a time between a control input given by ADV control system 111, given to an ADV control subsystem (e.g. throttle, steering, brakes), and the beginning of actuation of the control subsystem in response to the control input.

The control command 350 can be passed through a low-pass filter 351 before being passed to the subsystem actuation 352. ADV's are "drive-by-wire," meaning that the control subsystem actuation is via transmission of a control command. In practice, control subsystem actuators are often provided by third parties, different from the designers of the ADV or the ADV controller. Thus, the designer of the ADV or ADV controller is aware that there are actuation delays, such as rise time 356, overshoot 357, and rise time 356, the designer of the ADV or ADV controller does not know the exact sources of the actuation delays. To the ADV designer or ADV controller designer, the control subsystem actuator is merely a "black box," which has actuation delays in relation to input control commands, Systems and methods described herein can identify and quantify the actuation delays, and time-latency, such that the ADV designer and ADV controller designer can account for the actuation delays and time-latency in improved ADV controllers and/or improved subsystem controller add-ons.

Figure 3D:
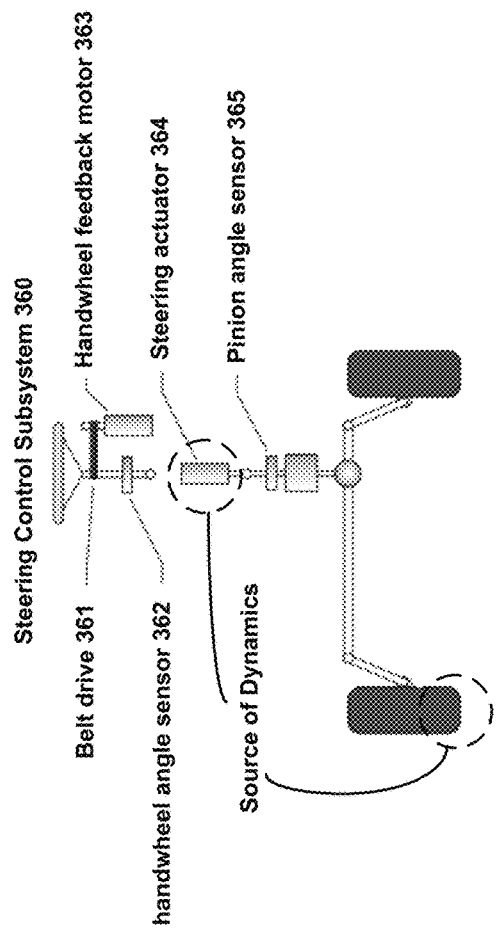
FIG. 3D illustrates a steering control subsystem as used in an autonomous vehicle, and sources of dynamics, according to an embodiment.

FIG. 3D illustrates a steering control subsystem as used in an autonomous vehicle, and sources of dynamics, according to an embodiment.

Steering control subsystem 360 is an example control subsystem of ADV 101. Steering subsystems in ADVs are typically "drive by wire" systems that receive a control command, e.g. control command 350, and execute the control command through physical and electronic means. Steering control subsystem 360 can include a belt drive 361, a handwheel feedback motor 363, a handwheel angle sensor 362, a steering actuator 364, a pinion angle sensor, and tires. Steering actuator 364, e.g., and tires, may introduce sources of actuation dynamic delay.

FIG. 4 is a block diagram illustrating system architecture for autonomous driving according to one embodiment. System architecture 400 may represent system architecture of an autonomous driving system as shown in FIGS. 3A and 3B.

Referring to FIG. 4, system architecture 400 includes, but it is not limited to, application layer 401, planning and control (PNC) layer 402, perception layer 403, driver layer 404, firmware layer 405, and hardware layer 406. Application layer 401 may include user interface or configuration application that interacts with users or passengers of an autonomous driving vehicle, such as, for example, functionalities associated with user interface system 113. PNC layer 402 may include functionalities of at least planning module 305 and control module 306. Perception layer 403 may include functionalities of at least perception module 302. In one embodiment, there is an additional layer including the functionalities of prediction module 303 and/or decision module 304. Alternatively, such functionalities may be included in PNC layer 402 and/or perception layer 403. System architecture 400 further includes driver layer 404, firmware layer 405, and hardware layer 406. Firmware layer 405 may represent at least the functionality of sensor system 115, which may be implemented in a form of a field programmable gate array (FPGA). Hardware layer 406 may represent the hardware of the autonomous driving vehicle such as control system 111. Layers 401-403 can communicate with firmware layer 405 and hardware layer 406 via device driver layer 404.

Figure 5:
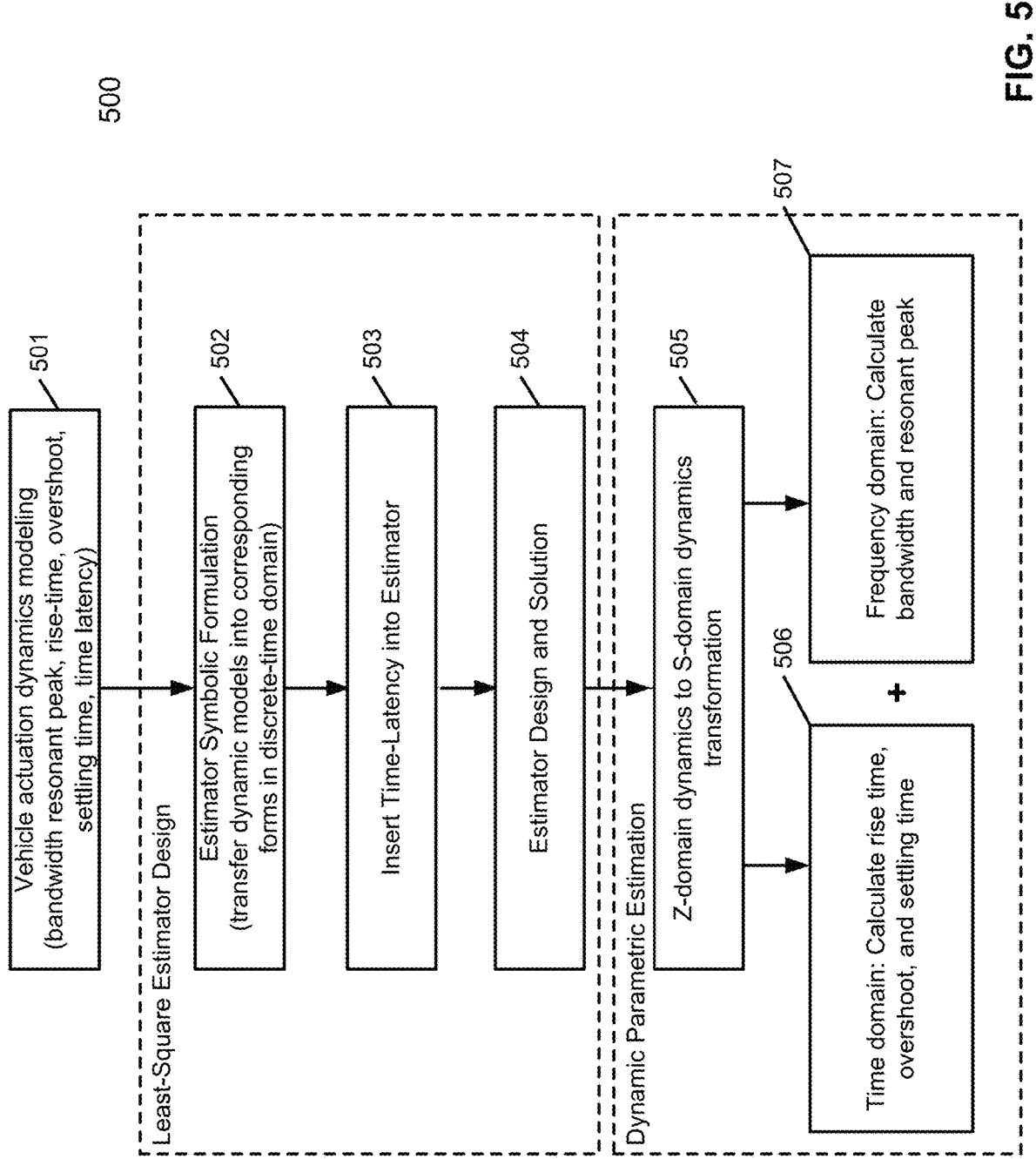
FIG. 5 block diagrams illustrating a data flow and a system that estimates metrics describing actuation dynamic delay of control subsystems of an autonomous driving vehicle, for use in improving an autonomous vehicle controller, according to one embodiment.

FIG. 5 block diagrams illustrating a dynamic parametric estimation system 500 and method that estimates metrics describing actuation dynamic delay of control subsystems of an autonomous driving vehicle, for use in improving an autonomous vehicle controller, according to one embodiment. Control subsystems can include braking, throttling, and steering systems of an autonomous driving vehicle (ADV). An object of the system and method 500 is determining a plurality of metrics that describe dynamic delays in actuation of a control subsystem (e.g. throttling, braking, and steering). In a time domain for a continuous-time dynamic system, the metrics can include a time-latency ($T_l$), rise time ($T_r$), settling time ($T_s$), and overshoot ($M_p$). In a frequency domain for a continuous-time dynamic system, the metrics can include dynamic bandwidth ($\omega_b$) and resonant peak ($M_r$) of a controller of the subsystem. The metrics are used to generate an ADV controller or an ADV control subsystem controller, or to improve an existing ADV controller or an ADV control subsystem controller. The method and system can include, for each of a plurality of control subsystems (e.g. throttling, braking, and steering), generating a dynamic model that models the actuation delays and time-latency attributable to the control subsystem of an ADV. The dynamic model has a plurality of parameters that, when applied to the dynamic model, provide a best estimate of the actuation delays and time-latency in the control subsystem described by the dynamic model. In an embodiment, parameters for a braking/throttle actuation dynamic model are different from parameters of a steering actuation dynamic model.

In operation 501, vehicle actuation dynamic models for throttle/braking and steering can be expressed as follows, with each actuation dynamic model having four parameters, $a_1$, $a_2$, $b_1$, and $b_2$. The parameters for an actuation dynamic model for throttle/braking can be different from the parameters for an actuation dynamic model for steering.

A longitudinal throttling/braking second order discrete-time dynamics model in the frequency domain can be expressed as:

$$acc_{measured}(z) = \frac{b_1 z + b_2}{z^2 + a_1 z + a_2} acc_{desired}(z)$$

where $acc_{desired}$ is the desired acceleration, or deceleration, command from the ADV controller, $acc_{measured}$ is the measured acceleration, or deceleration, from the throttle and/or braking control subsystem, and $a_1$, $a_2$, $b_1$, and $b_2$ are parameters of the second order dynamic model.

Lateral steering second order discrete-time dynamics model in the frequency domain can be expressed as:

$$\theta_{measured}(z) = \frac{b_1 z + b_2}{z^2 + a_1 z + a_2} \theta_{desired}(z)$$

where $\theta_{desired}$ is the desired steering angle from the ADV controller, $\theta_{measured}$ is the measured feedback steering angle from the chassis channel, and $a_1$, $a_2$, $b_1$, and $b_2$ are parameters of the second order dynamic model.

In operation 502, dynamic parameters estimation symbols are formulated.

Using the throttle control subsystem as an example, assume:

(1) Throttle control subsystem output $y(k)=acc_{measured}(k)$,
(2) Throttle control subsystem input $u(k)=acc_{desired}(k)$, and
(3) System error $e(k)=$ $$y(k) - \hat{y}(k) = acc_{measured}(k) - \frac{b_1 z + b_2}{z^2 + a_1 z + a_2} acc_{desired}(k).$$

Objects of the dynamic models, e.g. throttle/brake subsystem actuation dynamic model, are to:

(1) Estimate the dynamic parameters set $\pi=[a_1\ a_2\ b_1\ b_2]^T$ which make the system error $e(k)$ smallest in a least square form; and
(2) Estimate the bandwidth of the throttle/brake subsystem $\omega_{b-th}$ and resonance peak $M_{r-th}$ of the throttle/brake subsystem, based on the parameter set $\pi=[a_1\ a_2\ b_1\ b_2]^T$ In operation 503, a time-latency effect on a control subsystem (e.g. throttling, braking, and steering) input-output relationship is introduced into the actuation dynamics model parameter estimator. Due to the existence of the throttling time-latency, e.g. for throttling, $$L_{th} = \text{round}\left(\frac{\tau_{l-th}}{T_{sample}}\right),$$

the original system output $y(k)$ is replaced with the time-compensated system output $\bar{y}(k)=y(k+L_{th})$.

In operation 504, a dynamic model parameter estimator design and solution for one control subsystem (e.g. throttling, braking, or steering) is described. Assume for a single driving scenario, e.g. an S-curve navigation by the ADV, a number of total data frames for the S-curve is N. A best estimate of the actuation dynamic model parameters is obtained as follows:

$$e(k;\pi)=\bar{y}(k)+a_1\bar{y}(k-1)+a_2\bar{y}(k-2)-b_1 u(k-1)-b_2 u(k-2).$$

From existing stored, crowd-sourced, driving data, a set of outputs and inputs with length N is $\{\bar{y}(1)\ \bar{y}(2)\ \ldots\ \bar{y}(N)\ u(1)\ u(2)\ \ldots\ u(N)\}$ An estimator matrix can be defined as output matrix $Y(N)$ where:

$$\bar{Y}(N)=[\bar{y}(2)\bar{y}(3)\ \ldots\ \bar{y}(N)]^T$$

An error matrix $\in(N,\pi)$ can be defined as:

$$\in(N,\pi)=[e(2)e(3)\ \ldots\ e(N)]^T.$$

A state matrix $\Phi(N)$ of an auto-regressive moving average model (ARMA) can be defined as:

$\Phi(N)=[\varphi(2)\ \varphi(3)\ \ldots\ \varphi(N)]^T$ where:

$\Phi(N)$ is a matrix with 4 columns and $N-2+1$ rows, and $\Phi(k)=[-y(k-1)-y(k-2)u(k-1)u(k-2)]^T.$ Using the above terms, the expanded dynamic system can be rewritten as:

$$Y=\Phi\pi+\in(N;\pi)$$

Using a least-squares method, a best estimate of the dynamic parameter set can be expressed as $\pi_{LS}=(\Phi^T\Phi)^{-1}\Phi^T Y=[a_1\ a_2\ b_1\ b_2]^T.$ In operation 505, the original discrete-time dynamic model (one for each control subsystem), can be transformed into the continuous-time system. Using the parameters $a_1$, $a_2$, $b_1$, and $b_2$ obtained in operation 504, above, for the throttle/brake control subsystem, in the z-domain:

$$acc_{measured}(z) = \frac{b_1 z + b_2}{z^2 + a_1 z + a_2} acc_{desired}(z) \quad (1)$$

where $acc_{desired}$ is the desired acceleration, or deceleration, command from the ADV controller, $acc_{measured}$ is the measured acceleration, or deceleration, from the throttle and/or braking control subsystem, and $a_1$, $a_2$, $b_1$, and $b_2$ are parameters of the second order dynamic model.

With the Tustin Estimation method (known in the art), $$z = \frac{1 + \frac{h}{2}s}{1 - \frac{h}{2}s}.$$

Substituting this equation to the z-domain dynamics model (1), above, the continuous-time dynamic model (s-domain) will be:

$$acc_{measured}(s) = \frac{\bar{b}_1 s + \bar{b}_2}{s^2 + \bar{a}_1 s + \bar{a}_2} acc_{desired}(s). \quad (2)$$

Figure 6:
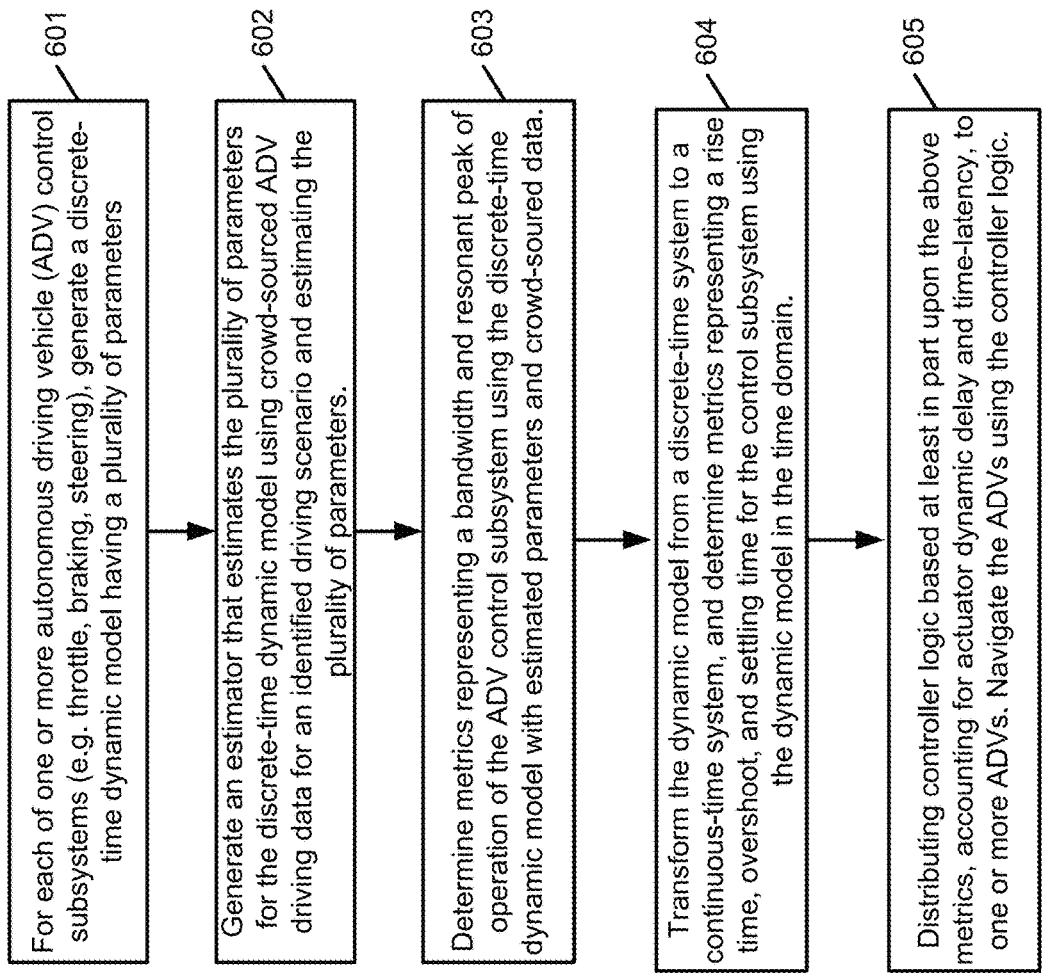
FIG. 6 is a block diagram illustrating a method of identifying actuation dynamic delays and time-latency in an autonomous vehicle control subsystem, according to one embodiment.

FIG. 6 illustrates a method 600 of identifying dynamic delay and time-latency in an actuator of a control subsystem (e.g. throttle, brake, or steering). Identifying the dynamic delay in a control subsystem enables development of an additional subsystem-specific controller, or extending an ADV controller, to account for dynamic delay and time-latency when actuating a control subsystem of an ADV. The additional subsystem-specific controller, or extended ADV controller, can more accurately and smoothly adhere to a planned trajectory of an ADV by accounting for second order actuation dynamics of the control subsystem.

In operation 601, for each of one or more autonomous driving vehicle (ADV) control subsystems (e.g. throttle, braking, steering), a discrete-time dynamic model is generated, in the frequency domain, having a plurality of parameters. Generating the discrete-time dynamic models in the frequency domain is described in detail, above, with reference to FIG. 5.

In operation 602, an estimator is generated that estimates the plurality of parameters for the dynamic model using crowd-sourced ADV driving data for an identified driving scenario. The plurality of parameters are then estimated using the estimator and crowd-sourced ADV driving data.

In operation 603, metrics representing bandwidth and resonant peak of the operation of the ADV control subsystem are determined, using the dynamic model with estimated parameters and crowd-sourced data.

In operation 604, the dynamic model is transformed from the discrete-time system to the continuous-time system. In the continuous-time system, metrics are determined representing a rise time, overshoot, and settling time for the ADV control subsystem using the continuous-time dynamic model.

In operation 605, subsystem controller logic is distributed to one or more, the logic based at least in part on the above metrics, accounting for the subsystem actuator dynamic delay and time-latency. The one or more ADVs are then navigated using the subsystem controller logic. In an embodiment, the subsystem controller logic is embodied in a separate controller that is added to, and interfaces with, the ADV controller.

Figure 7A:
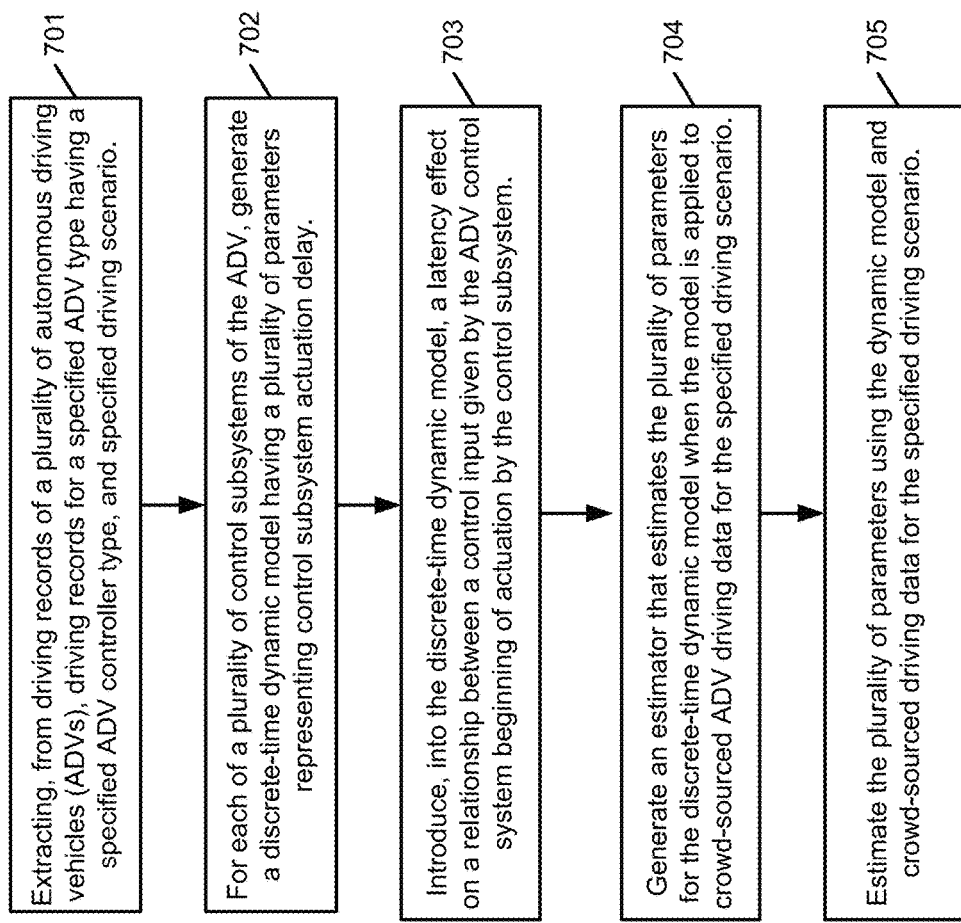
FIGS. 7A and 7B are block diagrams illustrating a method of identifying actuation dynamic delays and time-latency in an autonomous vehicle control subsystem, according to one embodiment.
Figure 7B:
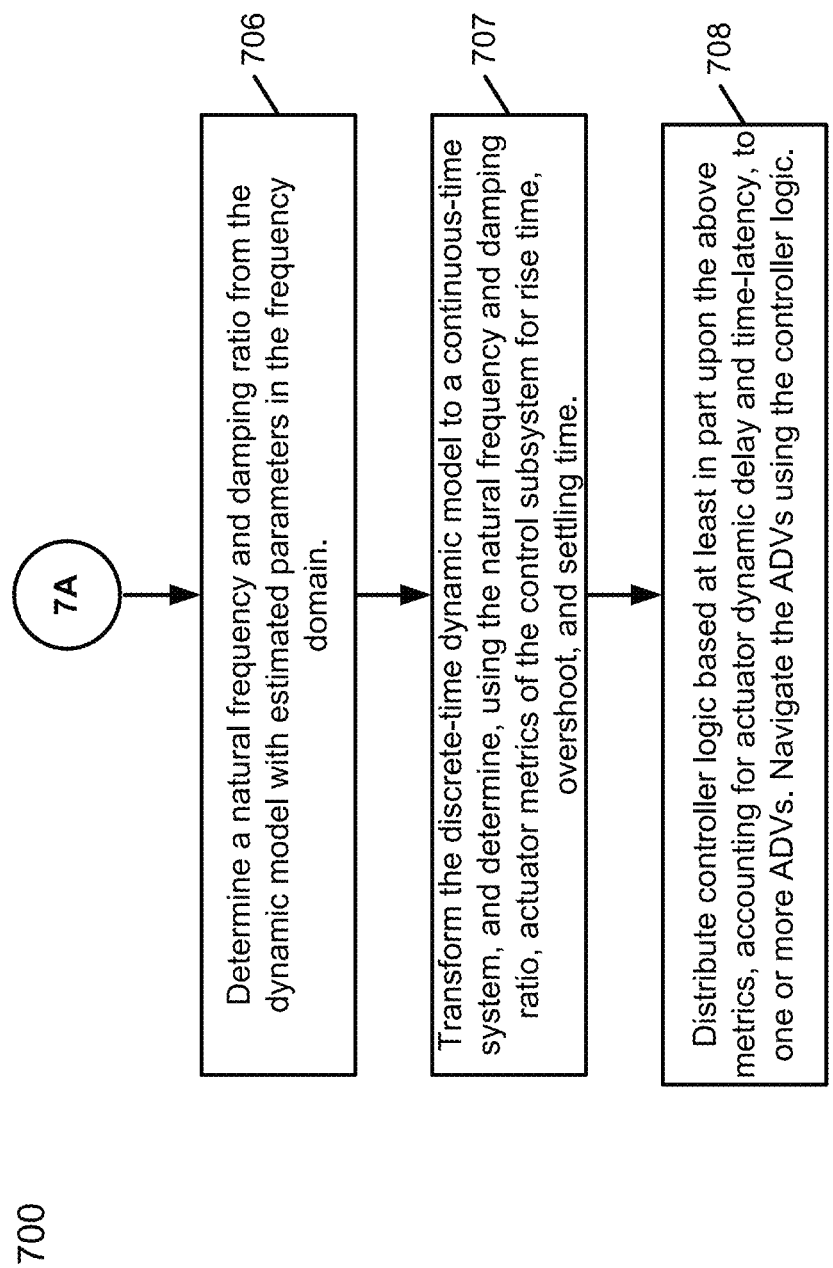

FIGS. 7A and 7B are block diagrams illustrating a method 700 of identifying actuation dynamic delays and time-latency in an autonomous vehicle control subsystem, according to one embodiment. Identifying the dynamic delay in a control subsystem enables development of an additional subsystem-specific controller, or extending an ADV controller, to account for dynamic delay and time-latency when actuating a control subsystem of an ADV. The additional subsystem-specific controller, or extended ADV controller, can more accurately and smoothly adhere to a planned trajectory of an ADV by accounting for second order actuation dynamics of the control subsystem.

Referring now to FIG. 7A, in operation 701, a system extracts driving records from a large plurality of ADV driving records. In an embodiment, the driving records are extracted from a database of general-purpose driving records as opposed to driving data generated by specified test driving scenarios. Driving records can be selected for any or all of: a specified ADV type (e.g. Toyota Prius, mini-van, Honda Accord, etc.), a specified ADV controller type (Model Predictive Controllers, Linear Quadrature Regulator), or specified driving scenario.

In operation 702, for each of one or more autonomous driving vehicle (ADV) control subsystems (e.g. throttle, braking, steering), a discrete-time dynamic model is generated, in the frequency domain, having a plurality of parameters. Generating the discrete-time dynamic models in the frequency domain is described in detail, above, with reference to FIG. 5.

In operation 703, a time-latency term can be introduced into the discrete-time dynamic model in the frequency domain. The time-latency term accounts for a relationship between a control input from an ADV control system, given to an ADV control subsystem (e.g. throttle, steering, brakes), and the beginning of actuation of the control subsystem in response to the control input.

In operation 704, an estimator is generated that estimates the plurality of parameters for the dynamic model using crowd-sourced ADV driving data for an identified driving scenario. The plurality of parameters are then estimated using the estimator and crowd-sourced ADV driving data.

In operation 705, metrics representing bandwidth and resonant peak of the operation of the ADV control subsystem are estimated, using the discrete-time dynamic model with estimated parameters and crowd-sourced data.

Referring now to FIG. 705, a natural frequency and a damping ratio are determined using the discrete-time dynamic model, and estimated parameters.

in operation 707, the dynamic model is transformed from the discrete-time system to the continuous-time system. In the continuous-time system, metrics are determined representing a rise time, overshoot, and settling time for the ADV control subsystem using the continuous-time dynamic model.

In operation 708, subsystem controller logic is distributed to one or more, the logic based at least in part on the above metrics, accounting for the subsystem actuator dynamic delay and time-latency. The one or more ADVs are then navigated using the subsystem controller logic. In an embodiment, the subsystem controller logic is embodied in a separate controller that is added to, and interfaces with, the ADV controller. Method 700 ends.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method of improving an autonomous driving vehicle (ADV) control system, comprising:
   for each of one or more ADV control subsystems, generating a discrete-time dynamic model having a plurality of parameters, the discrete-time dynamic model characterizing an actuation delay of the ADV control subsystem;
   estimating each of the plurality of parameters for the discrete-time dynamic model using crowd-sourced ADV driving data for a predetermined driving scenario;
   determining a bandwidth metric of the ADV control subsystem using the discrete-time dynamic model with the estimated parameters; and
   transforming the discrete-time dynamic model into a continuous-time dynamic model and determining a rise time metric and an overshoot metric using the continuous-time dynamic model, wherein the bandwidth, rise time, and overshoot metrics are utilized by an ADV subsystem controller to compensate the actuation delay for autonomously driving an ADV.

2. The method of claim 1, further comprising determining a resonant peak metric of the ADV control subsystem using the discrete-time dynamic model, wherein the resonant peak metric is utilized by the ADV subsystem controller to compensate the actuation delay.

3. The method of claim 1, further comprising determining a settling time metric for the ADV control subsystem using the continuous-time dynamic model, wherein the settling time metric is utilized by the ADV subsystem controller to compensate the actuation delay.

4. The method of claim 1, wherein the actuation delay represents a difference between a time of an initial execution of a control command received by the ADV control subsystem and a time of a measured actuation of the ADV control subsystem in response to the initial execution of the control command.

5. The method of claim 1, wherein the one or more ADV control subsystems comprise one or more of a throttle control subsystem, a braking control subsystem, or a steering control subsystem.

6. The method of claim 1, wherein the crowd-sourced ADV driving data is selected according to one or more of: a specified ADV type, a specified ADV controller type, or one or more specified ADV subsystem controller types.

7. The method of claim 1, wherein the discrete-time dynamic model for the ADV control subsystem is a second order dynamic model of the form:

$$\text{subsystem}_{measured}(z) = \frac{b_1 z + b_2}{z^2 + a_1 z + a_2} \text{subsystem}_{desired}(z),$$

wherein the plurality of parameters are $a_1$, $a_2$, $b_1$, and $b_2$.

8. The method of claim 1, wherein generating the discrete-time dynamic model further comprises introducing a time-latency term for the ADV control subsystem, the time-latency term representing a time between transmitting of a command by an ADV controller and an initial execution of the command by the ADV subsystem controller.

9. The method of claim 1, wherein estimating the plurality of parameters includes performing a least-squares fit of the crowd-sourced ADV driving data to determine the parameters of the discrete-time dynamic model for the ADV control subsystem.

10. A non-transitory machine-readable medium having instructions stored therein, which when executed by a processor, cause the processor to perform operations of improving an autonomous driving vehicle (ADV) control system, the operations comprising:
    for each of one or more ADV control subsystems, generating a discrete-time dynamic model having a plurality of parameters, the discrete-time dynamic model characterizing an actuation delay of the ADV control subsystem;
    estimating each of the plurality of parameters for the discrete-time dynamic model using crowd-sourced ADV driving data for a predetermined driving scenario;
    determining a bandwidth metric of the ADV control subsystem using the discrete-time dynamic model with the estimated parameters; and
    transforming the discrete-time dynamic model into a continuous-time dynamic model and determining a rise time metric and an overshoot metric using the continuous-time dynamic model, wherein the bandwidth, rise time, and overshoot metrics are utilized by an ADV subsystem controller to compensate the actuation delay for autonomously driving an ADV.

11. The machine-readable medium of claim 10, wherein the operations further comprise determining a resonant peak metric of the ADV control subsystem using the discrete-time dynamic model, wherein the resonant peak metric is utilized by the ADV subsystem controller to compensate the actuation delay.

12. The machine-readable medium of claim 10, wherein the operations further comprise determining a settling time metric for the ADV control subsystem using the continuous-time dynamic model, wherein the settling time metric is utilized by the ADV subsystem controller to compensate the actuation delay.

13. The machine-readable medium of claim 10, wherein the actuation delay represents a difference between a time of an initial execution of a control command received by the ADV control subsystem and a time of a measured actuation of the ADV control subsystem in response to the initial execution of the control command.

14. The machine-readable medium of claim 10, wherein the one or more ADV control subsystems comprise one or more of a throttle control subsystem, a braking control subsystem, or a steering control subsystem.

15. The machine-readable medium of claim 10, wherein the crowd-sourced ADV driving data is selected according to one or more of: a specified ADV type, a specified ADV controller type, or one or more specified ADV subsystem controller types.

16. The machine-readable medium of claim 10, wherein the discrete-time dynamic model for the ADV control subsystem is a second order dynamic model of the form:

$$\text{subsystem}_{measured}(z) = \frac{b_1 z + b_2}{z^2 + a_1 z + a_2} \text{subsystem}_{desired}(z),$$

wherein the plurality of parameters are $a_1$, $a_2$, $b_1$, and $b_2$.

17. The machine-readable medium of claim 10, wherein generating the discrete-time dynamic model further comprises introducing a time-latency term for the ADV control subsystem, the time-latency term representing a time between transmitting of a command by an ADV controller and an initial execution of the command by the ADV subsystem controller.

18. The machine-readable medium of claim 10, wherein estimating the plurality of parameters includes performing a least-squares fit of the crowd-sourced ADV driving data to determine the parameters of the discrete-time dynamic model for the ADV control subsystem.

19. A data processing system, comprising:
a processor; and
a memory coupled to the processor to store instructions, which when executed by the processor, cause the processor to perform operations of improving an autonomous driving vehicle (ADV) control system, the operations including:
for each of one or more ADV control subsystems, generating a discrete-time dynamic model having a plurality of parameters, the discrete-time dynamic model characterizing an actuation delay of the ADV control subsystem;
estimating each of the plurality of parameters for the discrete-time dynamic model using crowd-sourced ADV driving data for a predetermined driving scenario;
determining a bandwidth metric of the ADV control subsystem using the discrete-time dynamic model with the estimated parameters; and
transforming the discrete-time dynamic model into a continuous-time dynamic model and determining a rise time metric and an overshoot metric using the continuous-time dynamic model, wherein the bandwidth, rise time, and overshoot metrics are utilized by an ADV subsystem controller to compensate the actuation delay for autonomously driving an ADV.

20. The system of claim 19, wherein the operations further comprise determining a resonant peak metric of the ADV control subsystem using the discrete-time dynamic model, wherein the resonant peak metric is utilized by the ADV subsystem controller to compensate the actuation delay.

* * * * *